United States Patent [19]

Herbst

[11] 4,271,429
[45] Jun. 2, 1981

[54] ARRANGEMENT FOR COLOR PICTURE SCANNING

[75] Inventor: Heiner Herbst, Haar, Fed. Rep. of Germany

[73] Assignee: Siemens Aktiengesellschaft, Berlin & Munich, Fed. Rep. of Germany

[21] Appl. No.: 57,001

[22] Filed: Jul. 12, 1979

[30] Foreign Application Priority Data

Aug. 31, 1978 [DE] Fed. Rep. of Germany ....... 2838099

[51] Int. Cl.³ .............................................. H04N 9/04
[52] U.S. Cl. ......................................... 358/54; 358/75
[58] Field of Search ................... 358/54, 75, 212, 213, 358/294

[56] References Cited

U.S. PATENT DOCUMENTS 3,239,606  3/1966  Chatten et al. ....................... 358/75

OTHER PUBLICATIONS

Lang, "Farbmetrik und Farbfernsehen" Oldenbourg, Munich 1978 pp. 122-124.

Primary Examiner—Robert L. Richardson
Attorney, Agent, or Firm—Hill, Van Santen, Steadman, Chiara & Simpson

[57] ABSTRACT

An arrangement for photoelectric scanning of color pictures evaluates scanning light beams in three or more color filters according to different sensitivity curves. Photoelectric receivers then derive evaluation signals which are coded in three color value signals. In such arrangements, construction which is as simple, as economical and as space saving as possible is desired. Linear charge transfer device image sensors are respectively aligned to one another and the same line of the color picture. The image points of at least one image sensor are divided into two or more groups to which color filters of different, group-specific evaluation curves and group-specific charge coupled devices are assigned at whose outputs separate evaluation signals occur. The area of application is in color film scanners in which a color television screen serves as the reproduction device.

18 Claims, 6 Drawing Figures

ARRANGEMENT FOR COLOR PICTURE SCANNING

BACKGROUND OF THE INVENTION

1. Field of the Invention

The present invention relates to an arrangement for scanning a color picture in which color filters are provided which evaluate the light beams performing the scanning according to three or more sensitivity curves lying in different spectrum areas and in which photoelectric receivers are arranged behind the color filters to generate evaluation signals individually allocated to these spectrum ranges.

2. Description of the Prior Art

An arrangement of the type generally set forth above can be derived from the book by H. Lang, "Farbmetrik und Farbfernsehen", Verlag R. Oldenbourg, Muenchen, 1978, pp. 122–124. In this publication, a line spot scanner for color transparencies is described in respect of FIG. 7.6 in which a Braun tube having a luminescent point describing a television screen is provided as the light source. The light beams from the source and respectively focused on an image point of the color picture penetrate the picture and are divided into three light beams, evaluated by color filters according to various spectrum range sensitivity curves, and photo currents are then produced in photo multipliers and converted into color value signals of the primary colors red, green and blue. The color value signals then, for example, control the brightness of the primary colors of a color television picture tube. Such a control is illustrated in FIG. 5.2 on Page 89 of the Lang book. Because of the small amount of light made available to the photo multipliers, the signal-to-noise ratio is small in this arrangement.

SUMMARY OF THE INVENTION

The object of the present invention is to provide an arrangement of the type generally mentioned above, which is significantly more free of interference than the known arrangement.

This object is achieved, according to the present invention, by utilizing photoelectric receivers which consist of one or more linear charge transfer device image sensors which are aligned with their image point rows to one and the same line of the color picture and in that a device for shifting the color picture projected onto the sensor planes is provided. The image points of at least one image sensor are combined into two or more groups, whereby they are respectively arranged behind color filters having different, group-specific spectrum ranges and whereby they are connectible with one of the predetermined plurality of group-specific charge transfer devices. The charge transfer devices respectively assigned to a group have an output for the sequential read-out of all sensor signals derived from this group.

The advantage which can be achieved in practicing the present invention is, in particular, that the arrangement for photoelectric color picture scanning can be constructed in a more simple and space-saving manner, whereby a particular interference-free operation is made possible at the same time.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
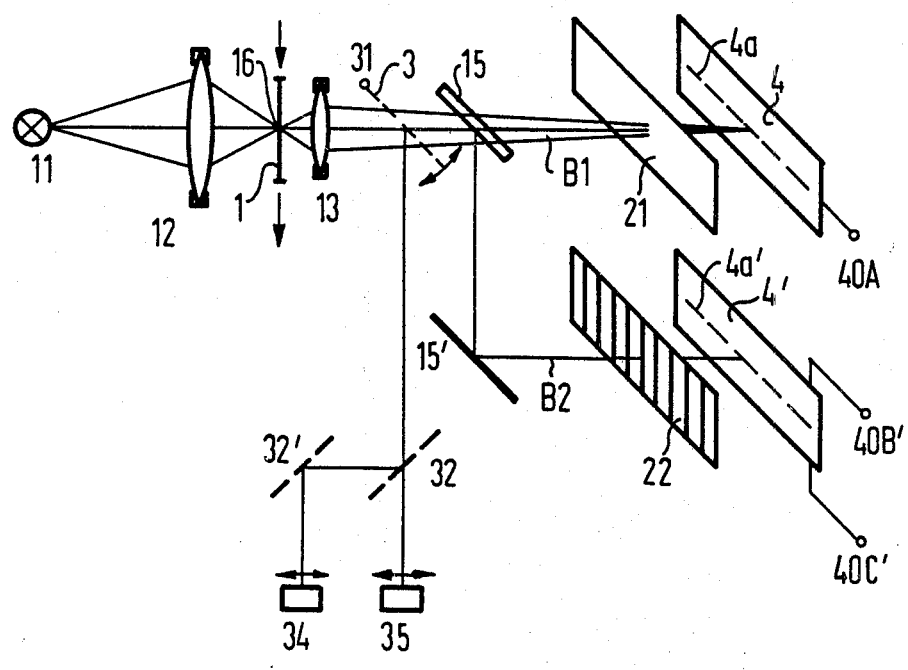
FIG. 1 is a diagrammatic view of a first exemplary embodiment of the invention.

An arrangement for photoelectric scanning of a transparent color picture 1 is illustrated in FIG. 1 as comprising a stationary light source 11, a first optics 12, a second optics 13, a beam splitter 15, 15′, color filters 21 and 22 and linear image sensors 4 and 4′ assigned to the color filters 21 and 22. The image sensors 4, 4′ are respectively situated in imaging planes on which a focused imaging of the color picture 1 occurs by means of the optics 12 and the optics 13.

The beam splitter 15, 15′ divides the light beams emanating from the source 11 and permeating the color picture 1 into two light beams B1 and B2 which are evaluated in the color filter 21 and the color filter 22 and permit correspondingly filtered imagings to arise in the planes of the image sensors 4 and 4′, respectively. As a beam splitter, for example, a half-silvered mirror 15 may be employed along with a completely reflecting mirror 15′ placed opposite thereto. Each of the linear image sensors has only one row of photosensitive points which are also designed as image points. The image point row of the image sensor 4 is designated 4a and that of the image sensor 4′ is designated 4a′. A line of the color picture 1, in the beam path illustrated in FIG. 1 the line proceeding through the point 16, which proceeds perpendicular to the plane of projection is respectively imaged on the image point rows.

The color filter 21 evaluates the light beam B1 according to a sensitivity curve which, for example, lies in a spectrum range assigned to the primary color green (G filter). On the other hand, the filter 21 can also evaluate according to a sensitivity curve which lies in a spectrum range which, for example, embraces the entire range of visible light. Thereby, it then exhibits a range of maximum sensitivity in the spectrum range of the primary color green. In the latter case, one also designates the color filter 21 as a W filter. The color filter 22 consists of strip-like filter portions which are alternately assigned as R filters (red filters) and B filters (blue filters). Herewith, it is understood that the filter portions of the R type have a sensitivity curve which lie in the spectrum range of the primary color red and that the filter portions of the B type have their sensitivity curve in the spectrum range of the primary color blue. A filter portion of the R type and a filter portion of the B type are alternately placed in front of the image points of the image sensor 4′ lying behind the filter 22 within their row.

If the color filter 21 is designed as a G filter and the color filter 22 consists of R and B filter portions, then an evaluation signal $u_G$ occurs at the output 40A of the image sensor 4, whereas evaluation signals $u_R$ and $u_B$ respectively appear at the outputs 40B' and 40C' of the image sensor 4'. These outputs correspond to the outputs 40A, 40B and 40C of FIG. 2 which will be discussed in detail below. Given a color filter 21 of the W type, an evaluation signal $u_W$ can be obtained at the output 40A.

Color value signals which then control the brightness of the primary colors of a color television picture tube can be derived in a known manner from the evaluation signals $u_G$, $u_R$ and $u_B$ or, respectively, from the evaluation signals $u_W$, $u_R$ and $u_B$. Depending on the gradient of the sensitivity curves and upon the width of the spectrum ranges defined thereby, a specific coding of the evaluation signals occurs in order to obtain the color value signals. Sensitivity curves of this type are illustrated, for example, in the aforementioned book by H. Lang on Page 91, FIG. 5.4.

Figure 2:
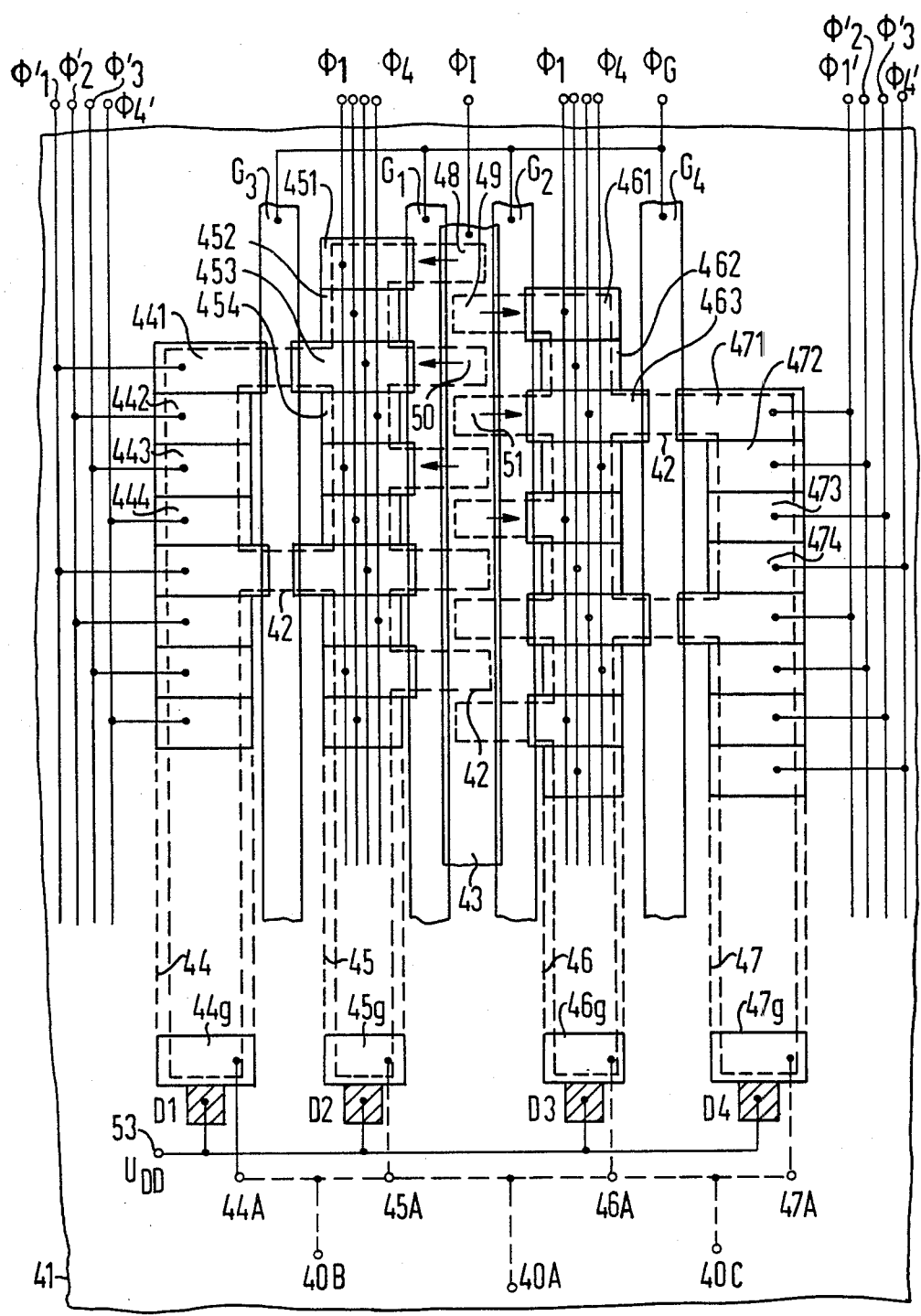
FIG. 2 illustrates, in planar form, a linear charge transfer device image sensor.

FIG. 2 illustrates one of the two charge transfer device (CTD) image sensors, for example, the sensor 4, as an integrated circuit on a semiconductor substrate, as viewed from the top. The semiconductor substrate consists, for example, of n conductive silicon and is referenced 41. An electrically insulating layer of, for example, $SiO_2$ covers the substrate surface and is designed significantly thinner within the broken line 42 than outside of the broken line. One also designates the thinner areas as gate oxide, and the thicker areas as field oxide areas. A central electrode 43 is situated above the insulating layer and is flanked on one side by electrode rows 44 and 45 and on the other side by electrode rows 46 and 47. The electrodes are conductive structures which particularly consists of portions of an electrically conductive coating applied over the entire surface. The coating, for example, is formed of polycrystalline, highly-doped silicon, or consists of a metal layer, for example, of aluminum. The manufacture of the electrodes 43 and of the electrode rows 44–47 occurs in a conventional manner, for example, by means of a series of photolithographic steps upon employment of masks which define the contours of the individual structures.

More specifically, the locations of the semiconductor substrate 41 covered by the electrode 43 and which are located beneath the thin oxide areas represent individual image points 48, 49, 50, 51, etc. of the image sensor. Since these image points form a line, such an image sensor is designated as a linear image sensor. The electrode rows 44–47 are respectively formed by individual electrodes 441, 442, 443, 444 . . . 451, 452, 453, 454 . . . which lie closely adjacent one another.

The electrode 451 is located at the level of the image point 48, the electrodes 452 and 461 are located at the level of the image point 49, the electrodes 441, 453 and 462 are located at the level of the image point 50, the electrodes 442, 454, 463 and 471 are located at the level of the image point 51, etc. A pair of transfer gate electrodes $G_1$ and $G_2$ is provided and these electrodes are respectively located between the electrode 43 and the electrode rows 45 and 46, and slightly overlap the electrode rows 45 and 46, but are electrically insulated therefrom by means of an intermediate layer. Further transfer gate electrodes $G_3$ and $G_4$ are located between the electrode rows 44 and 45 and the electrode rows 46 and 47. The electrode 43 is connected to a pulse voltage $\phi_I$, and the transfer gate electrodes $G_1$–$G_4$ are connected to a pulse voltage $\phi_G$ by way of a common connection. Every fourth electrode 451, 454, etc. of the row 45 is connected with a pulse voltage $\phi_1$ by way of a common line; each fourth electrode 452, 455, etc. is connected to a pulse voltage $\phi_2$ by way of a common line; each fourth electrode 453, etc. is connected to a pulse voltage $\phi_3$; and each fourth electrode 454, etc. is connected to a pulse voltage $\phi_4$. In an analogous manner, the individual electrodes of the row 46 are connected with the pulse voltages $\phi_1$–$\phi_4$, whereas the electrodes of the rows 44 and 47 are connected with pulse voltages $\phi_1'$–$\phi_4'$. Each of the electrode rows 44–47 belongs to a CCD and are pulsed by means of the pulse voltages $\phi_1$–$\phi_4$ or, respectively, $\phi_1'$–$\phi_4'$. At the lower end of each electrode row, electrodes 44g–47g are provided which are connected free of the clock pulse voltages but which, however, are connected to respective outputs 44a–47a. These electrodes have output-side diffusion areas D1–D4 arranged thereafter which are connected to a drain voltage $U_{DD}$ by way of a common connection 53. The outputs 44A–47A can be connected with a common output 40A.

During operation, a pulse $\phi_I$ is applied which determines the average or integration time. Within the same, electric charges collect in the image points 48–51, etc., under the influence of the illumination and corresponding magnitude to the respective local illumination intensity. At the end of the integration time, a transfer gate pulse $\phi_G$ causes the displacement of the charges out of the image points into the area of the charge transfer devices 44–47, in particular, the charge which arose under the electrode 48 under the electrode 451, the charge which goes under the electrode 49 under the electrode 461, the charge which arose under the electrode 50 under the electrode 441, and the charge which arose under the electrode 51 under the electrode 471. By means of the clock pulses $\phi_1$–$\phi_4$ and $\phi_1'$–$\phi_4'$ temporally occurring according to FIG. 3, the charges, after having passed through the charge transfer devices, are pushed through step-by-step under the electrodes 44g–47g and finally arrive in the diffusion areas D1–D4. The potential displacements occurring at the electrodes 44g–47g are transmitted to the outputs 44a–47a and produce read-out signals which consists of pulse-shaped portions occurring in succession, which respectively correspond to the illumination intensities in the image points successively read during the integration time.

The integration time defined by means of the next successive pulse $\phi_I$ coincides in time with the shift of the charges formed in the preceding integration by way of the charge transfer devices 44–47.

An image sensor according to FIG. 2 is described in detail in the German Pat. No. 2,553,658. A simplification of this circuit is possible insofar as the charge transfer devices 44 and 47 can be eliminated, whereby one reads only the devices 45 and 46. Thereby, the number of read image points is respectively reduced to one-half, in particular, to the points 48, 49 and such image points which respectively exhibit an interval with respect to these which amounts to a multiple of four electrode intervals. An image sensor simplification in this manner is described, for example, in the IBM Technical Disclosure Bulletin, Vol. 16, No. 1, June 1973, pp. 173–174. In place of the illustrated charge transfer devices 44–47 which are to be interpreted as SCCD devices with a charge transport immediately beneath the substrate surface or as BCCD devices with a charge transport in the interior of the substrate, bucket brigade devices (BBD) known per se can also be employed in the sense of the present invention. Both systems of charge transfer devices are described in the book by Sequin and Tompsett, "Charge Transfer Devices", Academic Press, New York, 1975, pp. 1–18.

Figure 3:
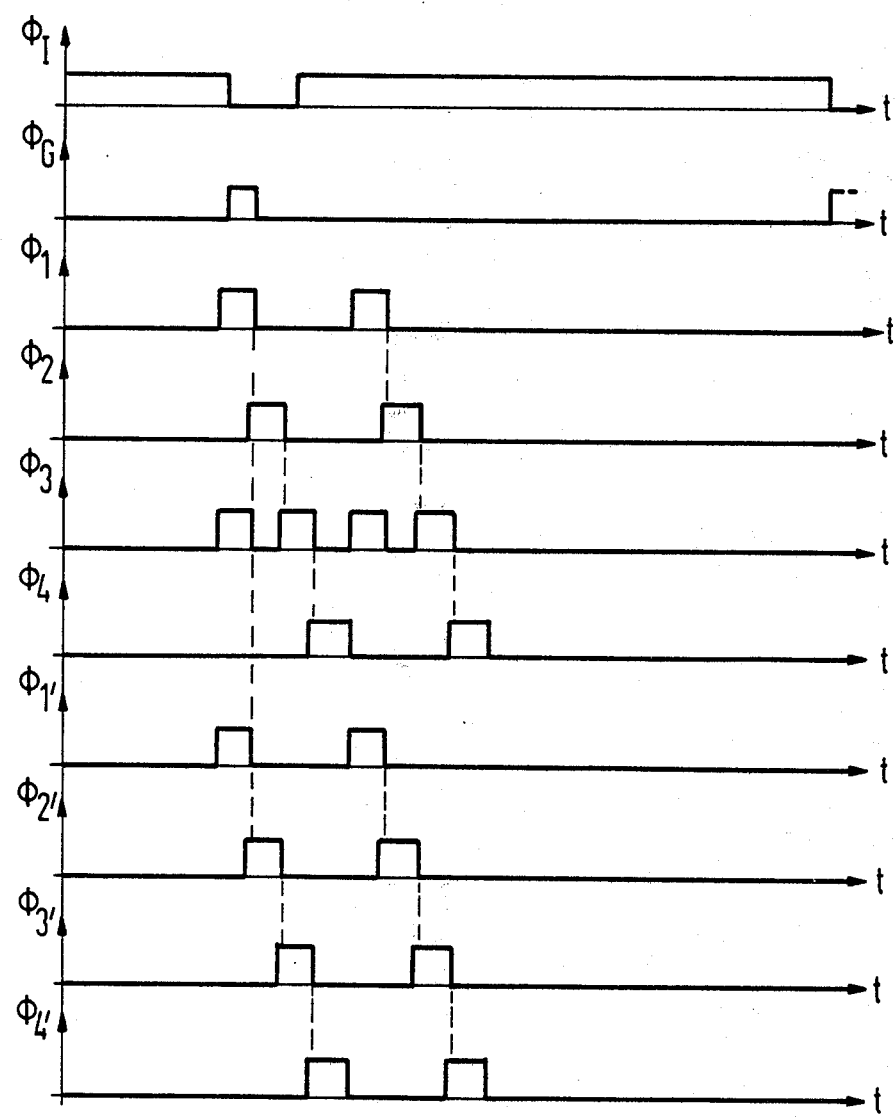
FIG. 3 is a graphic illustration of the voltage-time waveforms for explaining the manner of operation of an image sensor constructed in accordance with FIG. 2.

Instead of charge transfer devices which operate in four-phase operation, charge transfer devices may be employed which, in a manner known per se, operate in two or three phase operation. Finally, the center electrode 43 in FIG. 3 can be dissected into an electrode row corresponding to the parts 44–47, whereby, first, a common pulse $\phi_I$ defining the integration time is supplied to all electrodes of this row and, subsequently, clock pulses $\phi_1$–$\phi_4$ corresponding to FIG. 3 are communicated to the individual electrodes. Thereby, however, one must take into consideration that only the image points situated beneath each fourth electrode are illuminated. In the latter case, the output 40A is then connected to the lowest part of the electrode 43, which then represents a "floating gate" electrode, whereby the charge transfer device 44–47 can be omitted. In this case, the entire area of the insulation layer lying under the electrode 43 is designed as a gate oxide area.

In FIG. 1, the image sensor 4' is likewise designed according to this structure disclosed in FIG. 2, whereby its outputs are referenced with 40B' and 40C'.

For scanning the next line, the picture 1 in FIG. 1 is displaced parallel by one line interval, particularly in the framework of a continuous forward feed motion. Thereby, the imagings of the picture 1 projected onto the planes of the image sensors 4, 4' are also shifted, so that the image point rows are aligned to the next line. The displacement can also be undertaken by means of the device which transports a multitude of color pictures which are applied onto a common carrier in the direction of the arrow. In particular, a color film scanning can occur in this manner.

Another solution for achieving a line-wise forward feed resides in the provision that a mirror 3 (FIG. 1) is arranged in the beam path of the light beams, and which is rotatably mounted about a stationary axis 31. The beam is reflected by the mirror 3, which are again divided by means of a light splitter 32, 32' into two light beams, displays the imagings of the color picture 1 projected onto the planes of the two image sensors 34, 35 in the direction of the double-headed arrows, as a function of a rotary motion of the mirror 3.

In order to simplify the circuit set forth in FIG. 1, the charge transfer devices 44 and 47 can be omitted in the sensor 4, and likewise in the sensor 4'.

Figure 4:
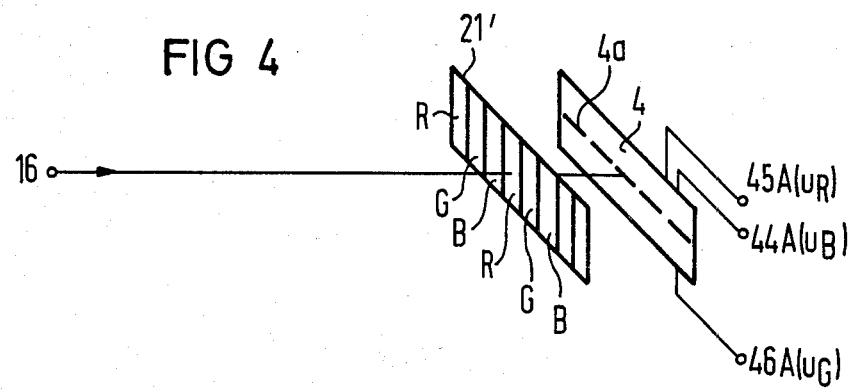
FIG. 4 diagrammatically illustrates a second exemplary embodiment of the invention.

FIG. 4 illustrates an exemplary embodiment of the invention in which a division of the light beams, proceeding along the line 16 is omitted. A filter 21' which has filter strips of the R, G and B types next to one another is inserted in the beam path. The image points of an image sensor 4 lie in sequence behind the R, G and B filters. If one designs the image sensor for a three-phase operation, which in FIG. 2 leads, among other things, to the fact that the charge transfer device 47 is omitted, then evaluation signals $u_B$, $u_R$ and $u_G$ can be tapped at the outputs 44A, 45A and 46A.

Figure 5:
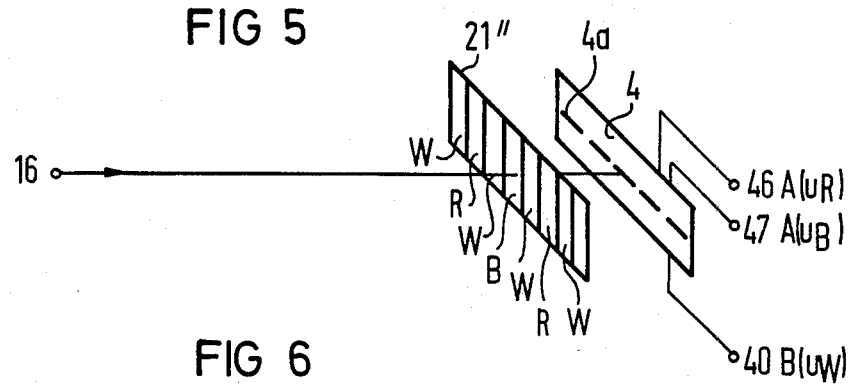
FIG. 5 diagrammatrically illustrates a third exemplary embodiment of the invention.

The arrangement according to FIG. 5 corresponds to that of FIG. 4 except for the difference of the filter 21" which has filter strips of the types W, R, W, B, W, R, etc. lying next to one another. By doing so, a four-phase arrangement for the image sensor 4 designed in accordance with FIG. 2 is provided, at whose outputs 46A, 47A and 40B (FIG. 2) the evaluation signals $u_R$, $u_B$ and $u_W$ can be read.

Figure 6:
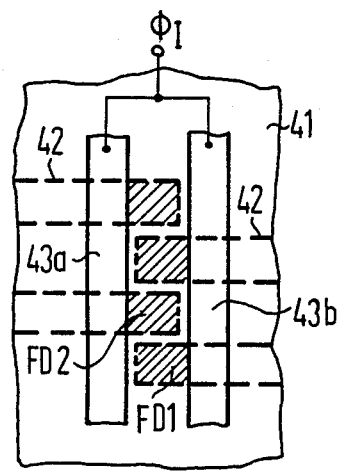
FIG. 6 illustrates a further development of the charge transfer device image sensor illustrated in FIG. 2.

FIG. 6 illustrates a further development of the image sensor illustrated in FIG. 2 in which the middle electrode 43 is longitudinally divided into two parts 43a and 43b which have a predetermined interval or spacing from one another. Thin oxide areas FD1, FD2, etc. illustrated in FIG. 2 and located between the parts 43a and 43b are re-doped so that the photo diodes arise which increase the sensitivity of the image sensor. The portion of the thin oxide area illustrated in FIG. 2 which respectively lies next to such a photo diode, but lies beneath one of the two electrode portions 43a or 43b, then forms a metal-insulaton-semiconductor (MIS) capacitor which stores the charge carriers generated by the photo diode.

For a better preparation of the evaluation signals read from the charge transfer devices, it is expedient to post-connect sample and hold stages which store a read signal value until it is replaced by the next successive read signal value to the outputs 44a–47a or, respectively, the outputs 40b and 40c or 40a.

The color filters 21, 22, 21' 21" can either be arranged on transparent carrier plates which are then secured to the image sensors or can consist of color layers which are directly applied to the surface of the image sensors.

In order to obtain the evaluation signals $u_R$ and $u_B$ it is sufficient in many cases to select the plurality of assigned image points significantly smaller than the plurality of image points required for the derivation of the signal $u_W$. For example, the plurality of image points serving for the production of the signals $u_R$ and $u_W$ can be respectively amount to one-fourth of the plurality of the image points provided for the $u_W$ signal.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for scanning a color picture with light beams, comprising:
   photoelectric receiving means including at least one charge transfer device image sensor having a row of image points receiving light from a line of the color picture, a plurality of charge transfer devices operably connected to said image points;
   color filter means located in the light path including a plurality of color filters each located in front of a respective image point, said plurality of color filters being serially arranged with respect to one another in a row and having different spectrum ranges which repeat in a serial pattern so as to project a corresponding pattern of light on the respective image points;
   shift means for shifting the color images on said image points;
   said image sensor including output means for providing sequential read-out of sensor signals.

2. The arrangement of claim 1, comprising:
   means for shifting the light beam including a pivotally-mounted mirror.

3. The arrangement of claim 1, comprising:

a transport device operable to shift the color picture perpendicular to the line direction.

4. The arrangement of claim 3, wherein:
said transport device is constructed to include a common carrier for mounting a plurality of color pictures.

5. The arrangement of claim 1, wherein said image sensor comprises:
a doped semiconductor substrate including photodiodes in said substrate, and doped opposite thereto, as said image points.

6. The arrangement of claim 1, wherein said image sensor comprises:
a semiconductor substrate having a plurality of metal-insulation-semiconductor capacitors as said image points.

7. The arrangement of claim 6, comprising:
a plurality of photo diodes each adjacent a respective capacitor and forming therewith a respective image point.

8. The arrangement of claim 1, wherein:
said color filter means comprises transparent carrier means and color filters mounted on said carrier means.

9. The arrangement of claim 1, wherein:
said color filter means comprises color filters mounted on said image sensor.

10. The arrangement of claim 1, comprising:
a first charge transfer device image sensor comprising at least two of said charge-transfer device image sensors, said image points located in groups behind respective ones of said color filters having different, group-specific spectrum ranges and operably connected to with said at least two charge transfer devices;
said at least two charge transfer devices having group-specific output means;
an additional charge transfer device image sensor comprising additional charge transfer devices connected to said shift means and having its own output, and an additional row of image points coupled to said additional charge transfer devices to receive light from the same picture line of the color picture; and
an additional color filter ahead of said additional charge transfer device image sensor and having a different spectrum range.

11. The arrangement of claim 1, wherein:
said color filters comprise filter strips of first, second and third types located in front of said image points in a predetermined sequence;
each of said color filter types having a different color sensitivity;
the image points associated with said filter strips of said first type operably connected to first ones of said charge transfer devices;
the image points associated with said filter strips of said second operably connected to second ones of said charge transfer devices;
the image points associated with said filter strips of said third type operably connected to third ones of said charge transfer devices; and
said output means comprises first, second and third outputs for said first, second and third ones of said charge transfer devices.

12. The arrangement of claim 11, wherein:
said first, second and third types of color filter strip cover the respective spectrum ranges of the primary colors green, blue and red; and
said color filter strips are arranged in the repetitive sequence of first, second and third types.

13. The arrangement of claim 11, wherein
said first type of color filter strip covers approximately the entire spectrum range of visible light with a sub-range of maximum sensitivity in the spectrum range of one of the primary colors red, blue and green;
said second and third types of color filter strips covering respective spectrum ranges of the two other primary colors; and
said color filter strips arranged in the repetitive sequence of first type, second type, first type, third type, first type, second type, first type, third type, and so on.

14. The arrangement of claim 13, wherein:
said color filter strips of said first type having a maximum sensitivity in the sub-range of the primary color green.

15. The arrangement of claim 14, wherein:
said first ones of said charge transfer devices are grouped into first and second charge transfer devices;
first image points and second image points associated with said first type of color filter strips operably connected to said first and second charge transfer devices, respectively; and
each of said first and second charge transfer devices including a common output constituting said first output.

16. The arrangement of claim 15, and further comprising:
a plurality of sample and hold circuits connected to respective first, second and third outputs.

17. An arrangement for scanning a color picture with a scanning light beam scanning a line of a color picture, comprising:
beam splitting means for splitting the scanning light beam into first and second light beams;
first color filter means located in the path of said first light beam having a spectrum range which approximately covers the entire spectrum of visible light with a sub-range of maximum sensitivity in the spectrum range of the color green;
second color filter means located in the path of said second light beam and comprising first and second filter parts arranged alternately adjacent one another, said first filter parts having the sensitivity range of the primary color red and said second filter parts having the sensitivity range of the primary color blue;
shift means for providing shift pulses;
a first image sensor including first charge transfer devices connected to said shift means and including a row of first image points arranged in the path of said first light beam behind said first color filter means, and a first output for providing a sequential read-out of signals corresponding to light sensed by said image points; and
a second image sensor including second charge transfer devices and third charge transfer devices connected to said shift means and including a row of second image points arranged in the path of said second light beam behind said second color filter means and grouped in first and second groups corresponding to said first and second color filter parts, said first group respectively operably connected to said second charge transfer devices and said second group respectively operably connected to said third charge transfer devices;

said second charge transfer devices and said third charge devices including respective outputs for providing sequential read-out of signals corresponding to light sensed by the row of second image points.

18. An arrangement for scanning a color picture with a scanning light beam scanning a line of a color picture, comprising:

beam splitting means for splitting the scanning light beam into first and second light beams;

first color filter means located in the path of said first light beam having a spectrum range of the color green;

second color filter means located in the path of said second light beam and comprising first and second filter parts arranged alternately adjacent one another, said first filter parts having the sensitivity range of the primary color red and said second filter parts having the sensitivity range of the primary color blue;

shift means for providing shift pulses;

a first image sensor including first charge transfer devices connected to said shift means and including a row of first image points arranged in the path of said first light beam behind said first color filter means, and a first output for providing a sequential read-out of signals corresponding to light sensed by said image points; and a second image sensor including second charge transfer devices and third charge transfer devices connected to said shift means and including a row of second image points arranged in the path of said second light beam behind said second color filter means and grouped in first and second groups corresponding to said first and second color filter parts, said first group respectively operably connected to said second charge transfer devices and said second group respectively operably connected to said third charge transfer devices;

said second charge transfer devices and said third charge devices including respective outputs for providing sequential read-out of signals corresponding to light sensed by the row of second image points.

* * * * *